United States Patent
Coelho

(10) Patent No.: US 7,904,295 B2
(45) Date of Patent: Mar. 8, 2011

(54) METHOD FOR AUTOMATIC SPEAKER RECOGNITION WITH HURST PARAMETER BASED FEATURES AND METHOD FOR SPEAKER CLASSIFICATION BASED ON FRACTIONAL BROWNIAN MOTION CLASSIFIERS

(76) Inventor: Rosangelo Fernandes Coelho, Rio de Janeiro (BR)

( * ) Notice: Subject to any disclaimer, the term of this patent is extended or adjusted under 35 U.S.C. 154(b) by 948 days.

(21) Appl. No.: 11/661,956

(22) PCT Filed: Sep. 2, 2004

(86) PCT No.: PCT/BR2004/000164
§ 371 (c)(1),
(2), (4) Date: Mar. 2, 2007

(87) PCT Pub. No.: WO2006/024117
PCT Pub. Date: Mar. 9, 2006

(65) Prior Publication Data
US 2007/0233484 A1   Oct. 4, 2007

(51) Int. Cl.
*G10L 17/00* (2006.01)
(52) U.S. Cl. .......................................... 704/250
(58) Field of Classification Search .................. 704/250
See application file for complete search history.

(56) References Cited

U.S. PATENT DOCUMENTS

| | | | | |
|---|---|---|---|---|
| 6,424,946 B1 * | 7/2002 | Tritschler et al. | ............. | 704/272 |
| 6,597,660 B1 * | 7/2003 | Rueda et al. | ............... | 370/230.1 |
| 6,608,815 B1 * | 8/2003 | Huang et al. | .................. | 370/232 |
| 6,856,948 B1 * | 2/2005 | Tran | .................................. | 703/2 |
| 7,035,790 B2 * | 4/2006 | Rajan | ........................... | 704/201 |
| 7,222,075 B2 * | 5/2007 | Petrushin | ...................... | 704/270 |
| 7,636,309 B2 * | 12/2009 | Alicherry et al. | .......... | 370/230.1 |
| 7,660,248 B1 * | 2/2010 | Duffield et al. | ............ | 370/230.1 |

OTHER PUBLICATIONS

An approach to speaker identification using multiple classifiers. Acoustics, Speech, and Signal Processing, 1997. IEEE International Conference on Munich, Germany Apr. 21-24, 1997 Lo p. 1136: Description of the Classifiers.*
Speaker recognition: a Tutorial, Campbell, J.P., Jr.; Proceedings of the IEEE, vol. 85, Issue 9, Sep. 1997 pp. 1437-1462 p. 1438: Generic Speaker Verification. p. 1438: Generic Speaker Verification.*

* cited by examiner

*Primary Examiner* — Susan McFadden
(74) *Attorney, Agent, or Firm* — TraskBritt

(57) ABSTRACT

It is proposed a text-independent automatic speaker recognition (ASkR) system which employs a new speech feature and a new classifier. The statistical feature pH is a vector of Hurst parameters obtained by applying a wavelet-based multi-dimensional estimator (M dim wavelets) to the windowed short-time segments of speech. The proposed classifier for the speaker identification and verification tasks is based on the multi-dimensional fBm (fractional Brownian motion) model, denoted by M dim fBm. For a given sequence of input speech features, the speaker model is obtained from the sequence of vectors of H parameters, means and variances of these features.

8 Claims, 8 Drawing Sheets

METHOD FOR AUTOMATIC SPEAKER
RECOGNITION WITH HURST PARAMETER
BASED FEATURES AND METHOD FOR
SPEAKER CLASSIFICATION BASED ON
FRACTIONAL BROWNIAN MOTION
CLASSIFIERS

FIELD OF THE INVENTION

The present invention relates generally to the field of voice recognition techniques. More specifically, the present invention relates to a method for automatic speaker recognition, which includes speaker verification and speaker identification.

RELATED ART

In the known art speech recognition is based on the extraction of the features from a speech signal. There are at least three different types of recognitions related to the extraction of the information from a speech signal, namely: Automatic Speech Recognition, a process that allows a means to identify the words that a person speaks; Automatic Speaker Recognition, a process that allows a means to recognise the speaker; and automatic language recognition.

Automatic speaker recognition is a generic expression which relates to a process for identifying a speaker by means of his/her speech features. In this specification the "automatic speaker recognition" may be denoted by the acronym ASkR, and both can be used indistinctly.

Speaker Recognition systems are required when speakers are unknown and the recognition of their identities is important. By using a ASkR process a decision is made on whether or not a speech has been made by a registered speaker and/or whether or not a speaker is who he/she claims to be, and to this end a speaker identification step and a speaker verification step must be carried out.

Speaker Recognition systems can be used to control the access to systems such as voice mail, information services, telephone banking, telephone shopping, remote access to computers, database access services, security control for confidential information areas, etc.

In the speaker identification step a speech utterance has to be recognised from which of the registered speakers it belongs. In the speaker verification step a decision is made on accepting or rejecting the identity of a claimed speaker.

Speaker identity correlates with physiological and behavioural characteristics of the speaker. The most common physiological features used in the known speaker recognition methods are the pitch, the LPC (Linear Prediction Coefficient) derived cepstral parameters and the mel-cepstral coefficients.

Speaker recognition methods can be divided into text-dependent and text-independent methods. Text-dependent speaker-recognition methods require the speaker to say key words or sentences having the same text for both training and recognition trials. Text-independent speaker-recognition methods do not rely on a specific text being spoken.

A method of automatic speaker recognition generally comprises the steps of data acquisition, pre-processing, extraction of the speech features and classification.

In the steps of data acquisition and pre-processing the speech signal is digitalised and filtered. It is also made a division of the speech signal in frames, in order to select speech signal samples. The main objective of the feature extraction is to extract relevant characteristics of the speech signal for the next step, which is the classification step, when it is made the speaker identification and/or the speaker verification.

Generally, the physiological features used in the known speaker recognition methods are not robust to channels acoustic distortion and their extraction from the speech signal requires a high computational load.

Moreover, due to the great complexity of these known methods, which require the use of complex extraction/estimation methods to make the recognition of the speaker, and therefore a great computational load, usually the speaker recognition cannot be obtained in real-time, i.e., during the speakers' activity.

The present invention relates to a text-independent Automatic Speaker Recognition method which makes use of a new statistical feature and a new classifier to make the speaker recognition and or the speaker verification. Unlike the physiological features used in the known speaker recognition methods, the feature used in the present invention is robust to channel distortions, requires less complex extraction/estimation methods and can be obtained in real-time.

BRIEF DESCRIPTION OF THE DRAWINGS

The invention will be described herewith more details together with the attached drawings which accompany the present specification, wherein.

DETAILED DESCRIPTION OF THE INVENTION

Figure 1:
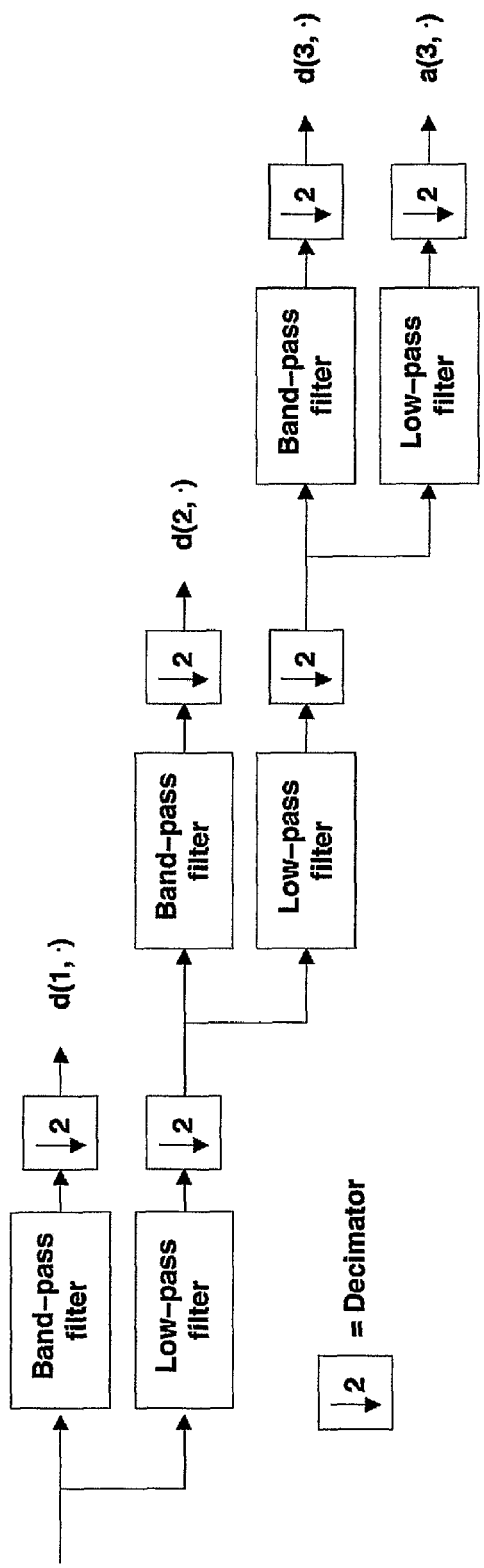
FIG. 1 illustrates an example of the AV estimator using 3 decomposition scales to obtain a single H value.

According to the present invention use is made of a new statistical feature (pH), consisting of a vector of Hurst parameters for ASkR systems. As previously mentioned, the (pH) feature is robust to channel distortions, requires less complex extraction/estimation methods and can be obtained in real-time, i.e., during speakers' activity.

For the purposes of the invention, when comparing the (pH) feature with the standard features it is not considered data mismatch between training and recognition data, i.e., there is no need to channel compensation procedures. Only in this situation, the use of time derivatives features, such as delta cepstrum, could be interesting.

Even in this case, compensation techniques (e.g., "mean normalization") are much more effective than the use of delta cepstrum. For the above reasons, delta parameters are not considered in this invention.

The new proposed classifier (M_dim_fBm) is based on the fractional Brownian motion (fBm) stochastic process. According to the principles of the invention the speech signal is not considered as a fractal or self-similar process.

The new classifier is applied to any feature matrix. The M_dim_fBm exploits the relationship and the evolution of the matrix elements to derive a speaker model. Only for fractal or self-similar processes, we can relate the Hurst (H) parameter to a fractal dimension ($D_h$), through the equation:

$$D_h = 2-H$$

Where $D_h$ is the fractal Hausdorff dimension.

It is known in the art the use of fractal dimension in pattern recognition studies and for discriminating fricative sounds. It is also known in the art speaker identification systems based on the joint use of cepstral coefficients and fractal dimension. In contrast to the principles of this invention, all the above mentioned systems share hypothesis that the speech is a fractal signal.

Several classification procedures—such as the GMM (Gaussian Mixture Model), the AR (Auto-Regressive) vector model and the Bhattacharyya distance have been proposed for ASkR systems. These techniques are used for comparative purposes in the performance evaluation of the proposed classifier M_dim_fBm.

The M_dim_fBm models the speech characteristics of a particular speaker using the pH feature along with the statistical means and variances of the input speech matrix features. According to the present invention, the proposed classifier yields a better modelling accuracy with a lower computational load.

The M_dim_fBm is characterized by the use of only 3 scalar parameters (i.e., mean, variance and H), while the GMM requires the use of 32 Gaussians, each one characterized by 1 scalar parameter, 1 mean vector and 1 covariance matrix, to achieve comparable performance results.

The Hurst Parameter

In this specification it is used the H notation for a single Hurst parameter. The new proposed feature used in the present invention is a vector of H parameters and is denote by pH.

The Hurst parameter is well known and widely used in performance evaluation of transmission systems and communications nets, for example, for data analysis in the Internet. In such systems the use of a single Hurst parameter is sufficient to attain the desired results. However, as will be seen in more details later, in the field of ASkR systems it would not be possible to use a single Hurst parameter to make a speaker recognition.

The Hurst parameter (H) expresses the time-dependence or scaling degree of a stochastic process. It can also be defined by the decaying rate of the auto-correlation coefficient function:

$$(-1 < \rho(k) < 1) \text{ as } k \to \infty$$

The speech signal will be herein represented by a stochastic process X(t) with finite variance and normalized auto-correlation function (ACF) or auto-correlation coefficient:

$$\rho(k) = \frac{\text{Cov}[X(t), X(t+k)]}{\text{Var}[X(t)]}, \quad k = 0, 1, 2, \ldots$$

where $\rho(k)$ belongs to $[-1, 1]$ and $\lim_{k \to \infty} \rho(k) = 0$.

The asymptotic behaviour of $\rho(k)$ is given by:

$$\rho(k) \sim L(k) k^{2(H-2)}$$

where $L(k) = H(2H-1)$. The H parameter is then the exponent of the Auto Correlation Function (ACF) of a stochastic process. The stochastic processes can be classified according to the value of H ($0 < H < 1$) as:

a) Anti-Persistent processes, wherein $0 < H < \frac{1}{2}$. The ACF rapidly tends to zero, and:

$$\sum_{k=-\infty}^{\infty} \rho(k) = 0$$

b) Processes with Short-Range Dependence (SRD); $H = \frac{1}{2}$. The ACF $\rho(k)$ exhibits an exponential decays to zero, such that:

$$\sum_{k=-\infty}^{\infty} \rho(k) = c$$

where $c > 0$ is a finite constant.

c) Processes with Long-Range Dependence (LRD): $\frac{1}{2} < H < 1$.

The ACF $\rho(k)$ is a slowly-vanishing function, meaning a dependence degree even between samples that are far apart. In this case:

$$\sum_{k=-\infty}^{\infty} \rho(k) = \infty$$

Some skilled artisans classify stochastic processes with long-range dependence ($H > \frac{1}{2}$) presence as self-similar or fractal processes. However, a Long-Range Dependence (LRD) process can only be considered as self-similar if it also shows distribution-invariance for any process increment.

The main self-similar stochastic process was proposed by Mandelbrot (M. Barnsley et al, The science of Fractal Images, USA: Springer-Verlag New York Inc. 1988). It is known as fractional Brownian motion (fBm), and is derived from a pure Brownian motion where $H = \frac{1}{2}$. Only for fractal or self-similar processes it is possible to relate the H parameter to a fractal dimension ($D_h$), through the equation $D_h = 2 - H$.

As previously mentioned, the fractal dimension have already been used for discriminating fricative sounds and for speaker identification. Some artisans share the hypothesis that speech is a fractal signal. In the present invention, however, although it is adopted the vector of H parameters as a speech feature, it is not assumed that the speech signal is a fractal or self-similar signal.

In order to analyse the impact of the speech time-dependence on the performance of a speaker recogniser, it is required accurate methods to estimate the H parameter. Several schemes are well known in the art, and have been widely used in the field of signal traffic modelling.

The appropriate method to be used in the speaker recognition task has to take into account the need of automatically estimating pH and the overall computational complexity of the estimator. The estimators considered by the inventor were the R/S (ReScaled adjusted range) statistic, the Higuchi and the wavelet-based Abry-Veitch (AV) estimator.

The R/S estimator can be used for any type of speech signal distribution. However, the R/S estimation of the H parameter is a time-consuming procedure since it depends on the user visual intervention to define the linear regression region.

The Higuchi estimator is appropriate for fractal stochastic processes only, and it cannot be proved that speech signals are fractals. For these reasons, both the R/S and the Higuchi methods were used only in a preliminary study, and the inventor used in the present invention the AV estimator because it allows an automatic estimation of the pH feature.

Moreover, the AV estimator enables the pH feature extraction in real-time and features a low computational cost when compared with the standard pHysiological features extraction.

The Abry-Veitch (AV) Estimator

The AV estimator uses the discrete wavelet transform (DWT) to successively decompose a sequence of samples into approximation (a(j,k)) and detail (d(j,k)) coefficients, where j is the decomposition scale and k is the coefficient index of each scale. FIG. 1 illustrates an example of the AV estimator using 3 decomposition scales to obtain a single H value The multi-resolution analysis adopted in the DWT of the AV estimator is a powerful theory that enables the detail and approximation coefficients to be easily computed by a simple discrete time convolution.

In simulations made by the inventor it was employed the Daubechies filters with 4, 6 and 12 coefficients to obtain the detail and approximation sequences. The linear computational complexity of the pyramidal algorithm to obtain the DWT is O(n), where n is the signal samples length. It is important to notice that the computational complexity of the FFT (Fast Fourier Transform), used to obtain the mel-cepstral coefficients, is O(nlog(n)).

The AV estimation can be described in three main pHases:
1. Wavelet decomposition: the DWT is applied to the sample data generating the detail coefficients d(j,k).
2. Variance estimation of the detail coefficients: for each scale j, it was evaluated the variance $\sigma^2_j=(1/n_j)\Sigma_k d(j,k)^2$, where $n_j$ is the number of available coefficients for each scale j. It can be shown that $$E[\sigma_j^2]=c_\gamma j^{2H-1}$$

where $c_\gamma$ is a constant.
3. Hurst parameter estimation: it is plotted $y_j=\log_2(\sigma^2_j)$ versus j. Using a weighted linear regression it is obtained the slope a of the plot and the H parameter is estimated as $H=(1+\alpha)/2$.

Figure 2A:
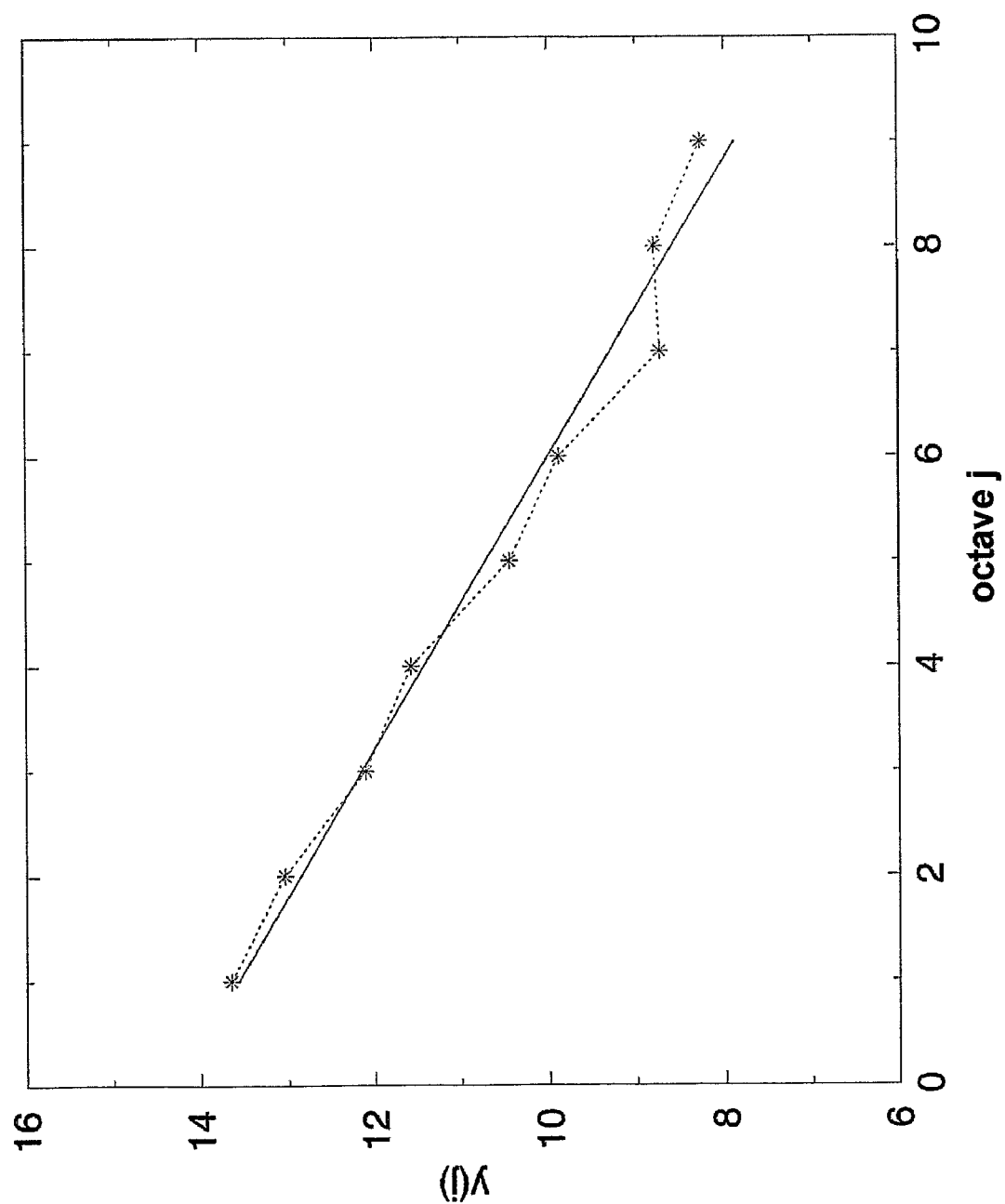
FIGS. 2a, 2b and 2c depict an example of the final step of a estimation process for a speech signal with H=0.2, H=0.5 and H=0.8, respectively.
Figure 2B:
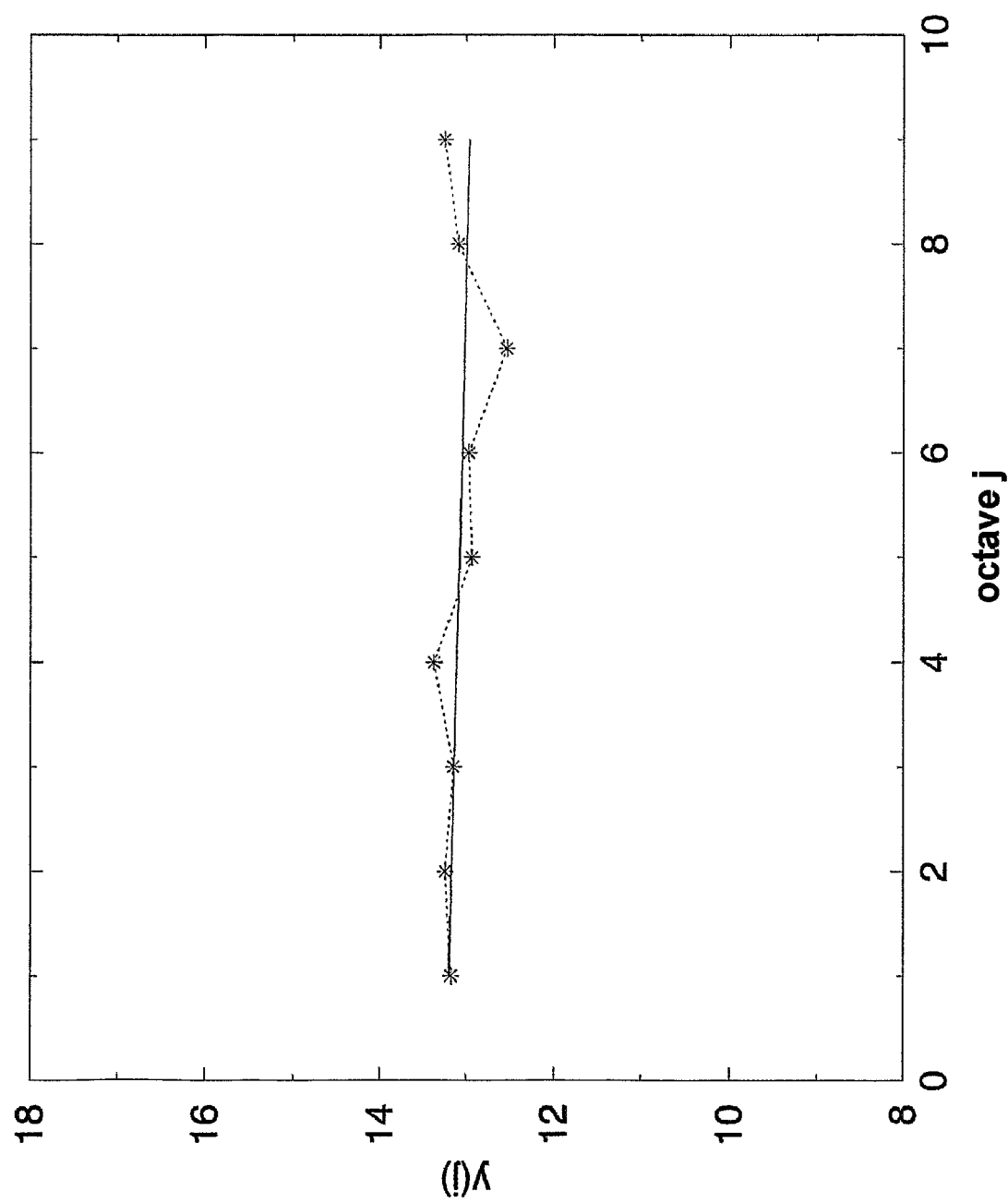
Figure 2C:
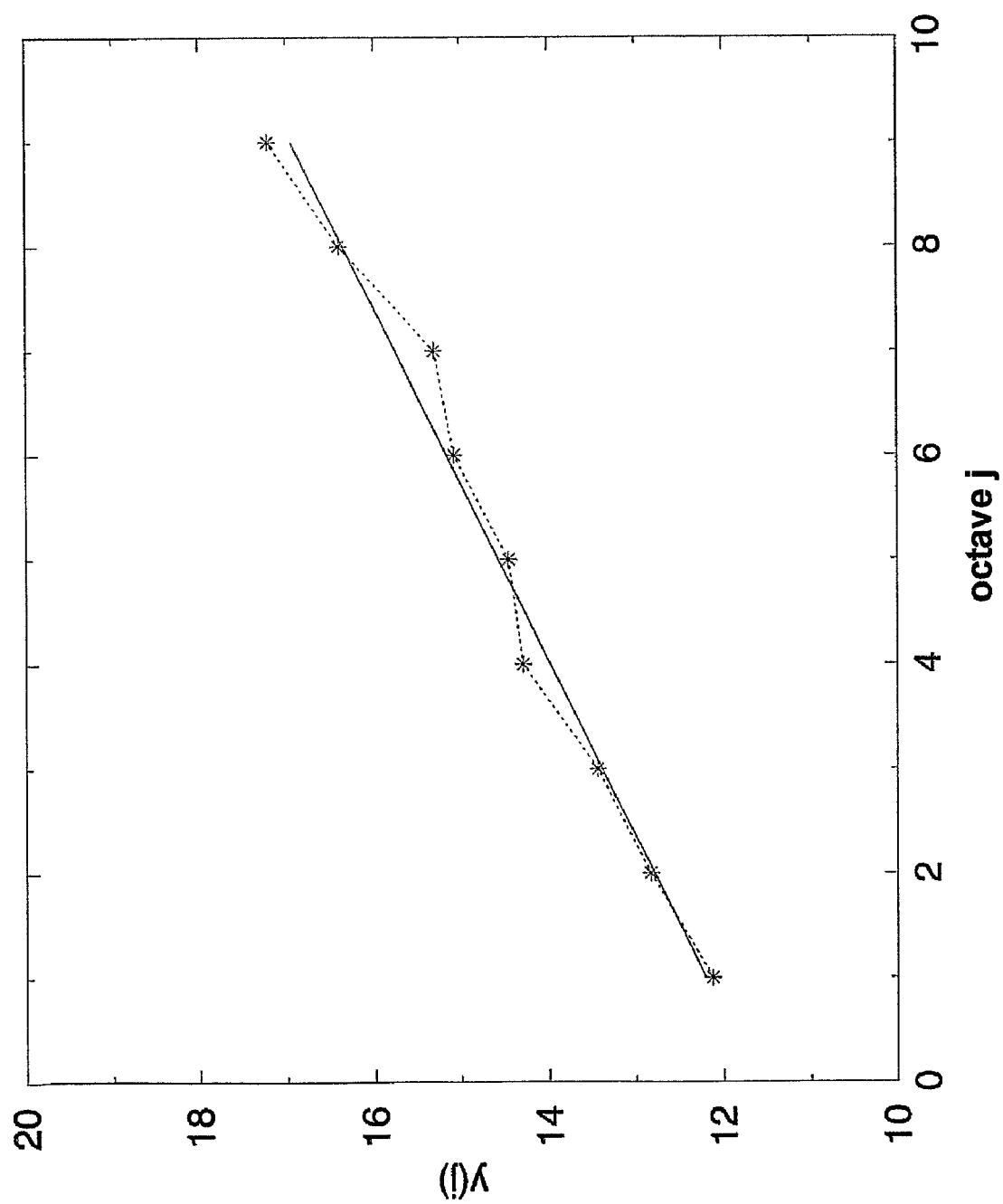

An example of the final stage of the estimation process for a speech signal with H=0.2, H=0.5 and H=0.8 is depicted in FIG. 2

As previously mentioned, the AV estimator is a good choice for the ASkR application due to its simplicity, low computational cost and the possibility of real-time implementation. However, the AV estimator is appropriate to stochastic processes t have only a single value of the time-dependence or scaling degree. They are known as mono-dependent processes.

The proposed method—M_dim_wavelets—is based on the AV estimator but provides more than one H parameter for each segment of speech. The M_dim_wavelets is a cascade of AV stages applied to each decomposition scale or sequence.

This multi-dimensional estimation leads to a vector of H parameters that composes the pH feature. The M_dim_wavelets method is described in more details later.

Figure 3:
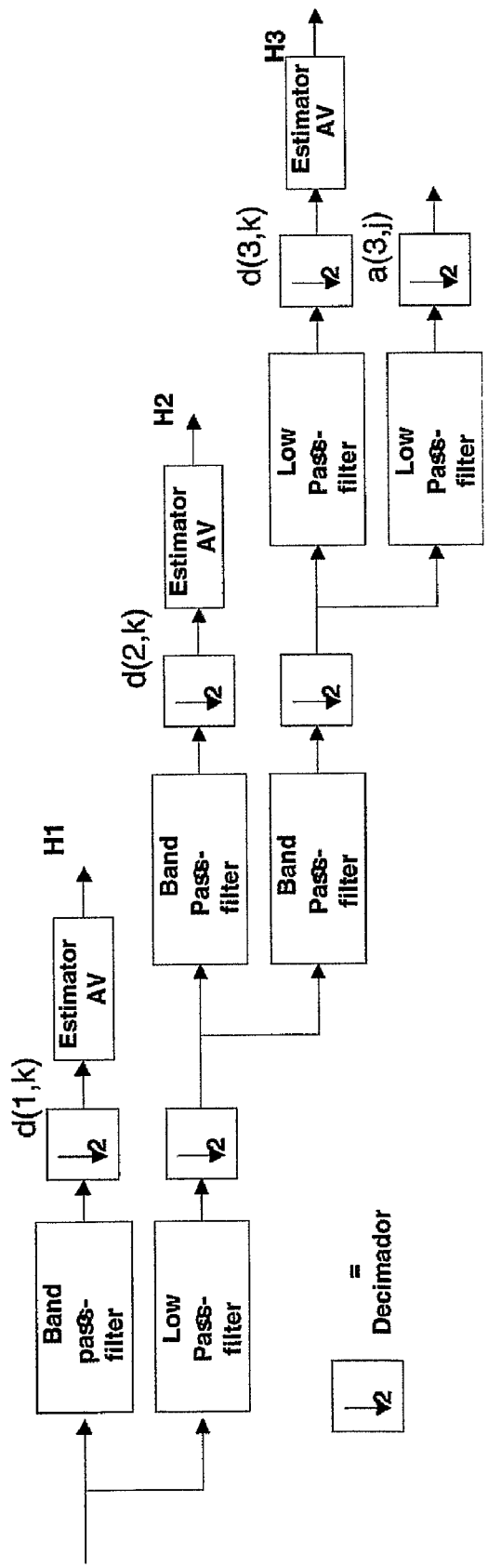
FIG. 3 shows an example of the M_dim_wavelets estimation also considering 3 decomposition stages.

FIG. 3 shows an example of the M_dim_wavelets estimation also considering 3 decomposItion stages.

Likewise the AV estimator, the wavelet-based multi-dimensional proposed estimator—M_dim_wavelets—uses the discrete wavelet transform (DWT) to successively decompose a sequence of samples into the detail and approximation coefficients.

From each detail sequence, d(j,k), generated by the filter bank in a given scale j, it estimated a H parameter, $H_j$. The set of $H_j$ values and the H value estimation obtained for the entire speech signal ($H_0$) compose the pH feature.

The M_dim_wavelets estimator can be described in two main steps:
1. Wavelet decomposition: the DWT is applied to the speech samples generating the detail sequences d(j,k).
2. pH estimation: application of the AV estimator to the entire speech signal ($H_0$) (see FIG. 1) and then to each of the J detail sequences obtained in the previous step (see FIG. 3). The resulting (J+1) H values will compose the pH feature.

The pH Extraction

For the purpose of the invention two procedures were examined for the pH extraction: frame-by-frame and cumulative.

1. Frame-by-frame

The speech signal is split into N frames (with overlapping) and the proposed estimator M_dim_wavelets is applied to each speech frame. This means that at each frame n, it is estimated several H parameter values. In this study, the pH matrix—containing the $pH$ vectors along the frames—was obtained from 80 ms frames with 50% overlapping.

2. Cumulative

In this procedure the proposed M_dim_wavelets estimator is applied at different time instants taking into account all the past history of the signal. This means that if we choose the time instants $t_1, t_2, \ldots, t_n$, the estimator will be applied to the 0 to $t_1$, 0 to $t_2$, ..., 0 to $t_n$ intervals.

In the cumulative procedure the evolution of the H parameter values converges to one H value. This single H result is equal to the $H_0$ value obtained from the frame-by-frame extraction, i.e., an estimation of H obtained directly from the speech signal samples without a previous windowing procedure.

Tests made by the inventor revealed that due to H values variability, the pH estimation employed on a frame-by-frame basis provides better speaker recognition results. Hence, this approach was adopted for the method of the present invention.

Therefore, a good configuration for extraction of the pH feature matrix is given by the following specifications:
1. Frame duration: 80 ms;
2. Daubechies wavelets with 12 coefficients;
3. Number of decomposition scales for the $H_o$: 6;
4. Coefficient range from 3 to 5.

The M_dim_fBm Classifier

The classifier proposed in this invention models each speaker on the basis of the speech features time-dependence or scaling characteristics. The speech signals are not necessarily assumed to be fractals. The main stochastic processes that can represent time-dependence or scaling characteristics are the fractional Brownian motion (fBm), the fractional Gaussian noise (fGn) and the fractional Autoregressive Moving Average (f-ARIMA) models The fGn and f-ARIMA processes are appropriate only for stochastic processes with H>½ (long-range dependence), while the fBm models stochastic processes can represent any value of H (0<H<1).

A. Fractional Brownian Motion

The fBm process is defined as a continuous parameter (f), zero mean and unit variance self-similar process. The film process, $X_H(t)$, features the following properties:
1. $X_H(f)$ has stationary increments.
2. The variance of its independent increments is proportional to its time intervals, according to the expression:

$$\text{Var}[X_H(t_2)-X_H(t_\tau)]\propto |t_2-t_\tau|^{2H}$$

for all instants t1 and t2.

3. $X_H(t)$ is a Gaussian process i.e., for any set $t_1, t_{2\tau}, \ldots, t_{0\tau}$, the random variables $X_H(t_1), X_H(t2), \ldots, X_H(t_n)$ have Gaussian distribution.
4. $X_H(0)$ and $E[X_H(t)]=0$ for any instant t.
5. $X_H(t)$ present continuous sample paths.

The fBm is considered a self-similar process sine statistical characteristics (mean marginal distribution and time-dependence degree) hold for any time scale. In other words, for any $\tau$ and r>0, $$[X_H(t+\tau)-X_H(t)]\tau \leq 0 \stackrel{d}{\approx} \tau^{-H}[X_H(t+\tau\tau)-X_H(t)]\tau \leq 0$$

where $\stackrel{d}{\approx}$ means equal n distribution and r is the process scaling factor ($r=\tau=|t_2-t_1|$).

Notice that $X_H(t)$ is a Gaussian process completely specified by its mean variance, H parameter and ACF given by:

$$\rho(k) = \frac{1}{2}[(k+1)^{2H} - 2k^{2H} + (k-1)^{2H}]$$

for $k \geq 0$ and $\rho(k)=\rho(-k)$ for $k \leq 0$

B. Description of the M_dim_fBm Classifier

As previously mentioned, the fBm is a mono-fractal stochastic process, i.e., it uses a single H parameter value. In order to be suitable for applications in ASkR systems, the inventor developed a novel classification scheme called multi-dimensional fractional Brownian motion (M_dim_fBm).

Similarly to the GMM classification procedure, this statistical classification scheme is based on the input features models. The M_dim_fBm model of a given speaker is generated according to the following steps:
1. Pre-processing: the feature matrix formed from the input speech features is split into r regions. This matrix contains c rows, where c is the number of feature coefficients per frame and N columns, where N is the number of frames. Notice that the M_dim_fBm classifier is not constrained to the proposed pH. It can be used with any selected set of speech features.
2. Decomposition: for each row of the feature matrix in a certain region it is applied the wavelet decomposition in order to obtain the detail sequences.
3. Parameters Extraction/Estimation: from each set of detail sequences obtained from each row of step 2, it is estimated the mean, the variance and the H parameters of the features being used by the ASkR system. For the H parameter estimation it is used the AV (Abry-Veitch) wavelet-based estimator.
4. Generation of fBm Processes: by using the Random Midpoint Displacement (RMD) algorithm and the three parameters computed in step 3, it is generated the fBm processes. Therefore, it is obtained c fBm processes for a given region.
5. Determining the Histogram and Generating the Models: it is computed the histogram of each fBm process of the given region. The set of all histograms defines the speaker c-dimensional model for that region.
6. Speaker Model: the process is repeated for all of the r regions. This means that it is possible have a r.c-dimensional fBm process, which defines the speaker M_dim_fBm model.

In the phase of tests it is used the histograms of the speaker M_dim_fBm model to compute the probability that a certain G-dimensional feature vector x belongs to that speaker. This is performed to the N feature vectors, resulting in N probability values: $P_1, P_2, \ldots P_N$. Adding these values, it is obtained a measure of the likelihood that the set of feature vectors under analysis belongs to that particular speaker.

EXAMPLES OF USE OF THE METHOD OF THE INVENTION

The inventor has made a comparison of the results of identification (Part A) and verification (Part B) performances of the proposed $SR_{Hurst}$ system with other ASkR schemes known in the art.

It is important to remark that in all experiments with the $SR_{Hurst}$ it was used the M_dim_fBm classifier with r=1 region only. This means that the speaker model is defined by a c-dimensional fBm process, where c is the number of feature coefficients.

The database used in the experiment is composed of 75 speakers (male and female from different Brazilian regions). In fact, there were two databases: in the first base the speech signal was recorded from a fixed telephone channel, and in the second base the speech was obtained from a mobile telephone channel.

Each speaker recorded four different text files (i.e., two different training and tests speech texts recorded from fixed and cellular pHones). The average speech duration used for training and tests was 167 seconds. Tests were applied to 20, 10 and 5 seconds speech segments A separate speech segment of 1 minute duration was used to train a speaker model.

A. Identification

The performance results of the identification systems (M_dim_fBm, GMM, AR-vector and dB) are presented in terms of the recognition accuracy. The results using the pH on a frame-by-frame basis satisfy the low computational cost requirement. On the other hand, the use of the mel-cepstrum and the joint use of the mel-cepstrum and the pH are useful in applications where the computational cost is not of major concern.

A.1 pH Feature

Table 1 shows the speaker recognition accuracy of the identification systems based on the pH for speech signals recorded from a fixed telephone channel. Table 2 shows the results for speech signals recorded from a mobile telephone channel.

TABLE 1

| Testing Interval | M_dim_fBm | GMM | AR | dB |
| --- | --- | --- | --- | --- |
| 20 s | 95.48 | 95.48 | 91.24 | 82.20 |
| 10 s | 94.22 | 94.09 | 83.39 | 72.62 |
| 5 s | 89.98 | 89.69 | 64.45 | 56.13 |

TABLE 2

| Testing Interval | M_dim_fBm | GMM | AR | dB |
| --- | --- | --- | --- | --- |
| 20 s | 87.53 | 86.85 | 79.86 | 74.66 |
| 10 s | 84.93 | 84.49 | 72.07 | 62.29 |
| 5 s | 61.43 | 61.10 | 52.41 | 44.78 |

As can be seen from the tables 1 and 2, the best results were obtained with the M_dim_fBm and the GMM classifiers for both cellular and fixed telephone recordings.

It is important to remark that for the pH feature it was used only 7H parameters per speech frame. This implies in a lower complexity of the classifiers as compared to the systems operating on 15 met-cepstral coefficients per frame. Moreover, it should be pointed out that the estimation of the pH feature requires less computational complexity (O(n)) than the extraction of the mel-cepstral coefficients (the FFT computational complexity is O(nlog(n))).

A.2 pH+Mel-cepstral Coefficients

In this second set of experiments it was examined the speaker recognition accuracy of the identification systems based on the mel-cepstral coefficients and on the fusion of the mel-cepstral coefficients and the pH. These results are shown in Tables 3 and 4, respectively, for speech signals recorded from a fixed telephone channel.

From a comparative analysis of these tables we verify that, except for the 10s tests with the AR-vector classifier, the best results were achieved by the systems based on the joint use of the mel-cepstral coefficients and the pH. This means that the proposed pH feature aggregates new information on the speaker identity. Again, in all the cases, the GMU and the M_dim_Bm classifiers provided the best results with a slight superiority of the latter one.

TABLE 3

| Testing Interval | M_dim_fBm | GMM | AR | dB |
| --- | --- | --- | --- | --- |
| 20 s | 98.54 | 97.95 | 96.81 | 95.48 |
| 10 s | 97.99 | 97.99 | 95.13 | 93.38 |
| 5 s | 97.59 | 97.46 | 59.47 | 84.17 |

TABLE 4

| Testing Interval | M_dim_fBm | GMM | AR | dB |
| --- | --- | --- | --- | --- |
| 20 s | 98.57 | 98.40 | 97.21 | 95.75 |
| 10 s | 98.62 | 98.51 | 92.54 | 94.61 |
| 5 s | 97.91 | 97.66 | 72.83 | 87.81 |

Table 5 shows the recognition accuracies of the identification systems based on the fusion use of the pH and the mel-cepstral coefficients, for speech signals recorded from a mobile telephone channel.

TABLE 5

| Testing Interval | M_dim_fBm | GMM | AR | dB |
| --- | --- | --- | --- | --- |
| 20 s | 98.19 | 98.14 | 88.82 | 85.75 |
| 10 s | 92.56 | 92.03 | 84.80 | 74.68 |
| 5 s | 89.96 | 89.96 | 76.09 | 52.28 |

By comparing the results of Tables 4 and 5 it is noted that the M_dim_fBm and GMM classifiers are more robust to the effects of the mobile telephone channel than the AR-vector and dB models For instance notice the case of the 20s testing interval. While the M_dim_fBm and GMM performance are degraded around 3\%, the AR-vector and dB classifiers performance decreases around 10%.

B. Verification

The performance results for the speaker verification systems were obtained by varying the threshold and computing the miss (false rejection) ($f_n$) and the false alarm (false acceptance) ($f_a$) probabilities. These error probabilities are plotted as Detection Error Tradeoff (DET) curves. It was used as background the UBM (Universal Background Model) model constructed from speech material of 20 speakers that do not belong to the set of 75 speakers used for the testing experiments.

B.1 pH Feature

Figure 4:
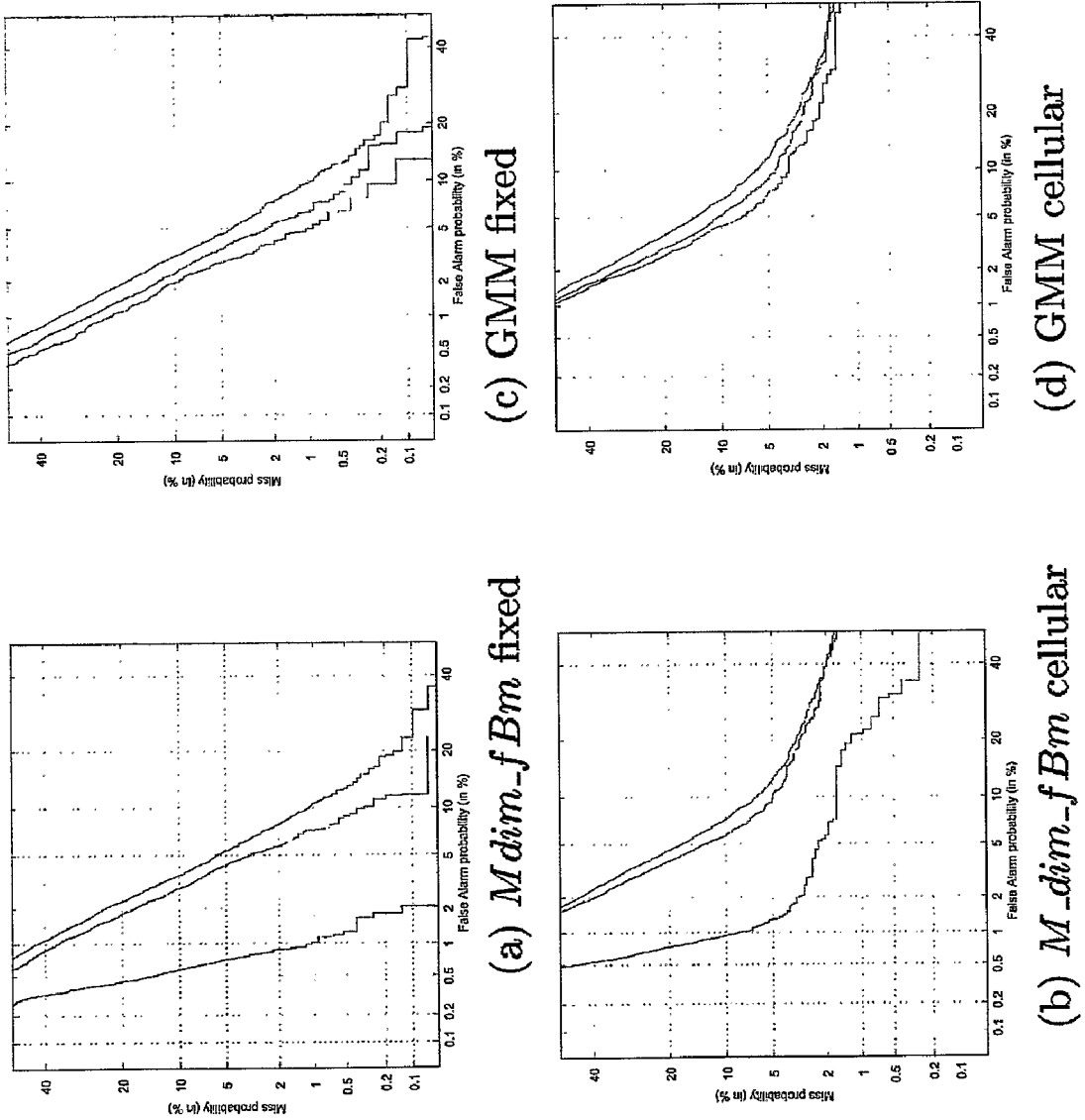
FIG. 4 shows the DET curves for the verification systems based on the pH.

In this section it is compared the proposed $SR_{Hurst}$ ASkR system with a scheme that is also based on the pH but uses a GMM classifier FIG. 4 shows the DET curves for the verification systems based on the pH. The M_dim_fBm ($SR_{Hurst}$) and GMM classifiers results are presented for 20s, 10s e 5s tests.

Table 6 shows the Equal Recognition Rates (ERR) for the operating point of the DET curve where $f_r=f_a$. This measure is given by ERR=(1−EER)100, where EER is the Equal Error Rate usually employed in the literature.

TABLE 6

| Testing Interval | M_dim_fBm | GMM | AR | dB |
| --- | --- | --- | --- | --- |
| 20 s | 98.93 | 96.67 | 97.12 | 96.69 |
| 10 s | 95.66 | 95.66 | 92.98 | 93.01 |
| 5 s | 94.76 | 94.37 | 92.67 | 92.11 |

From Table 6 it can be seen that the M_dim_fBm achieved better performance results for 20s testing and fixed telephone channel. In this condition, the M_dim_fBm classifier is almost 2% superior to GMM in terms of ERR performance. For the other cases, the ERR is comparable for both systems.

However, the DET curves show that for most of the operating points (miss probability×false alarm probability) the proposed classifier provides better results. Notice that the performance gains are substantial for a wide range of medium to low false alarm probabilities. It is important to remark that in most ASkR applications high false alarm probabilities must be avoided.

The results presented in this section show the superior modelling procedure of the M_dim_fBm strategy for the speaker verification task.

B.2 pH+Mel-Cepstral Coefficients

It is examine the fusion use of the pH and the mel-cepstral coefficients for the best speaker verification systems: the M_dim_fBm and the GMM. These systems were compared to the ones based only on the mel-cepstral coefficients.

Figure 5:
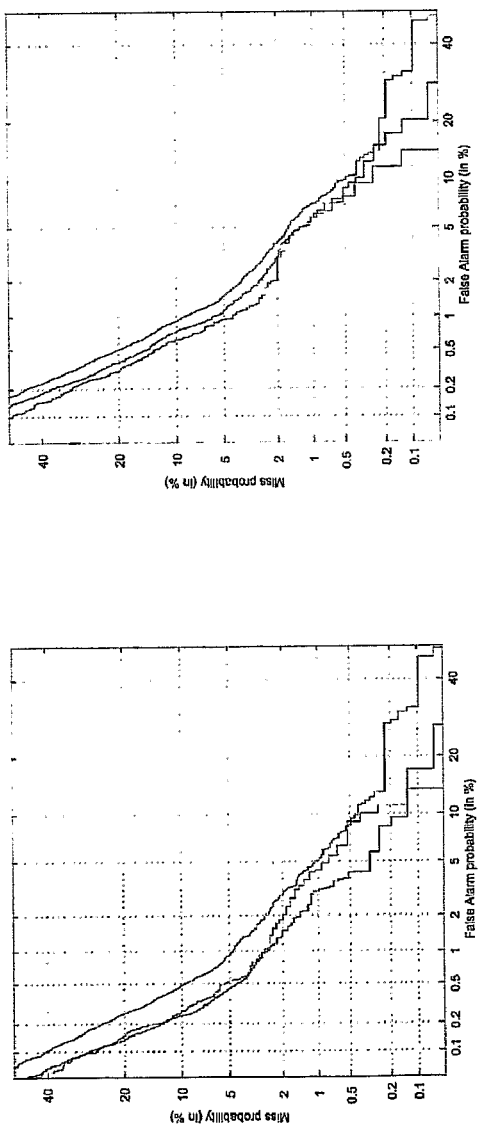
FIG. 5 shows the DET curves for the systems based only on the mel-cepstral coefficients.
Figure 5:
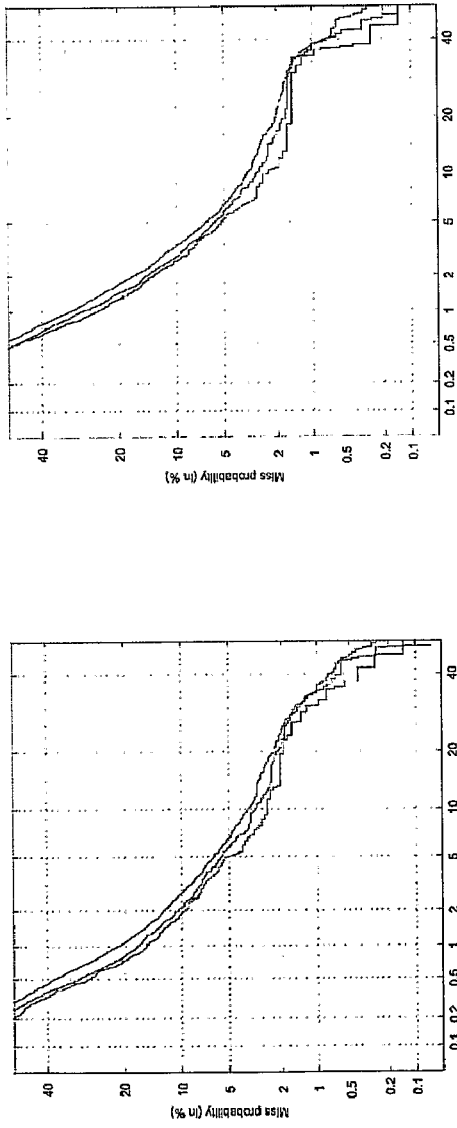
Figure 6:
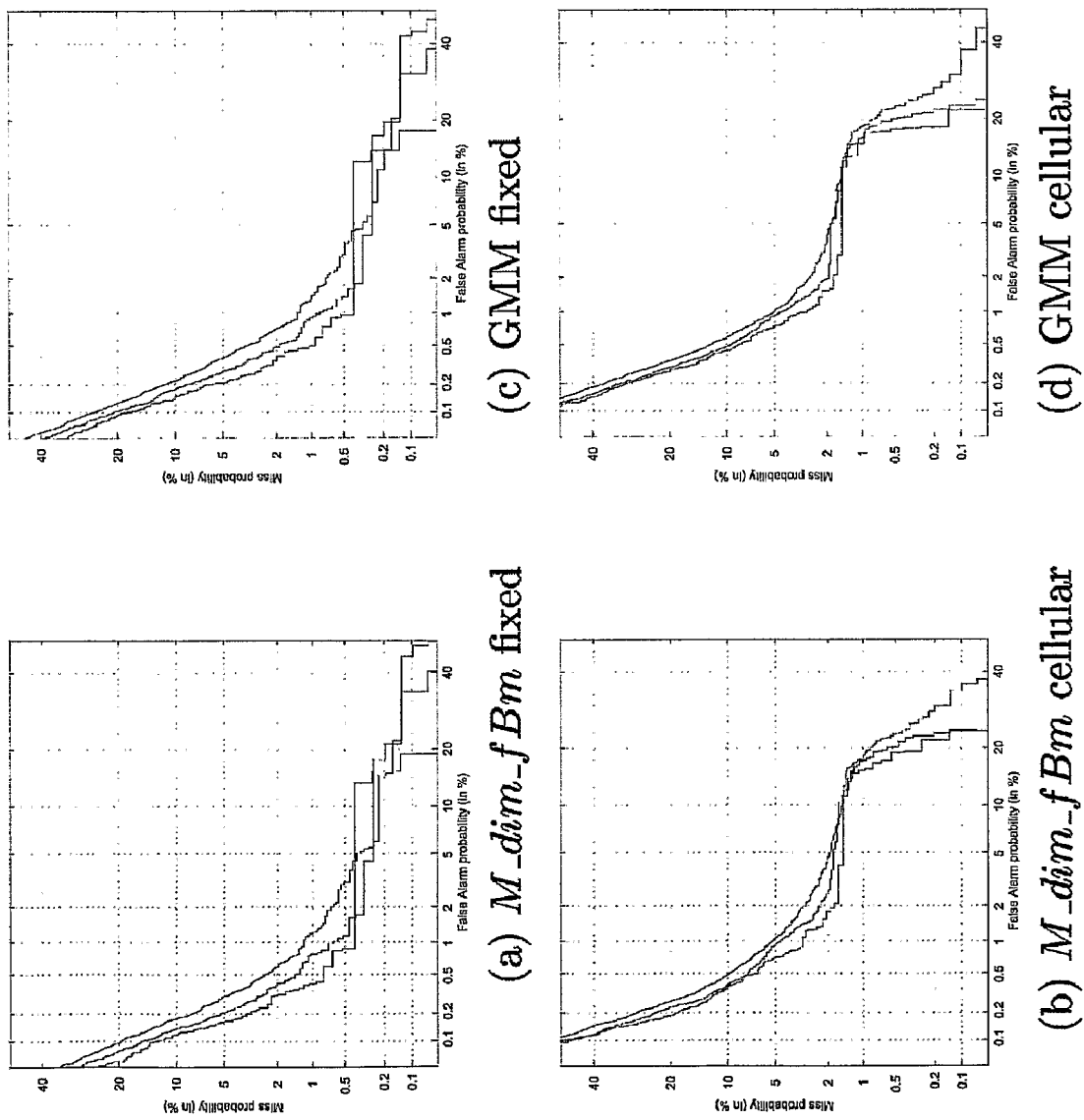
FIG. 6 depicts the DET curves for the systems based on the fusion use of the pH and the mel-cepstral coefficients.

FIG. 5 shows the DET curves for the systems based only on the mel-cepstral coefficients, while FIG. 6 depicts the DET curves for the systems based on the fusion use of the pH and the mel-cepstral coefficients.

Tables 7 and 8 show the equal recognition rate performances, i.e., the ERR for $f_r=f_a$ operating points of the DET curves.

TABLE 7

| Testing Interval | M_dim_fBm | GMM | AR | dB |
| --- | --- | --- | --- | --- |
| 20 s | 98.08 | 98.00 | 95.06 | 94.93 |
| 10 s | 98.31 | 97.59 | 94.67 | 94.63 |
| 5 s | 97.62 | 97.27 | 94.34 | 94.32 |

TABLE 8

| Testing Interval | M_dim_fBm | GMM | AR | dB |
| --- | --- | --- | --- | --- |
| 20 s | 99.33 | 99.20 | 98.21 | 98.09 |
| 10 s | 99.15 | 99.09 | 97.96 | 98.01 |
| 5 s | 98.87 | 98.81 | 97.49 | 97.42 |

For the systems based on the mel-cepstral coefficients, once again, the DET curves show that for most of the operating points, the M_dim_fBm performance gains are also substantial for a wide range of medium to low false alarm probabilities.

It should be reminded that this is a desirable range of operation for most speaker verification applications. On the other hand, the systems were comparable if they are based on the joint use of the pH and the mel-cepstral coefficients, when the performance are the highest ones.

The results presented in the Figures and tables show the improvement of the recognition accuracy when the systems are based on the fusion of the pH and the mel-cepstral coefficients. It is also important to note the 1% average recognition accuracy gain of the speaker verification systems based on the fusion of the pH and the mel-cepstral coefficients over the system based on the mel-cepstral coefficients for fixed telephone speech. This average gain increases to 3% for mobile telephone speech.

The results shown in this section, corroborate the superior modelling procedure of the M_dim_fBm method for the speaker verification task. Moreover, the M_dim_fBm result were achieved for a simpler mode wt dimension equals to 15. Each fBm is characterized by only 3 scalar parameters (i.e., mean, variance and H).

On the other hand, the GMM uses 32 gaussians, each one characterized by 1 scalar parameter, 1 mean vector and 1 covariance matrix to achieve the performance results. This means that the M_dim_fBm classifier yields a better modelling accuracy with a lower computational load The invention was described herewith according to its preferred embodiment. However, those skilled in the art would notice that other types of embodiments may be possible, while remaining within the spirit and scope of the present invention, and therefore the invention is only limited by the scope of the accompanying claims.

The invention claimed is:

1. Method for automatic speaker recognition comprising the steps of:
   obtaining a speech signal from a speaker;
   converting said speech signal to a digital signal by means of an A/D converter;
   extracting speech features from said digital speech signal; and
   classifying said speaker based on said extracted features, said classification encompassing speaker recognition and/or speaker verification;
   wherein a feature extracted in the extraction step is a Hurst parameter (pH).

2. The method according to claim 1 wherein the Hurst parameter (pH) is estimated using a Abry-Veitch $M_{13}$ dim_ wavelets extractor according to the following steps:
   applying a discrete wavelet transform said features to generate detail coefficients $d(j,k)$;
   estimating a variance for each said detail coefficient, wherein for each scale j, a variance $\sigma_j^2=(1/n_j)\Sigma_k d(j,k)^2$, wherein $n_j$ is the number of available coefficients for each scale j, and $E[\sigma_j^2]=c_y j^{2H-1}$, where $c_y$ is a constant are evaluated; and
   estimating said Hurst parameter by plotting $y_j=\log_2(\sigma_j^2)$ versus j using a weighted linear regression; and
   obtaining a slope α of said plot wherein said Hurst parameter (pH) is then estimated as $pH=(1+\alpha)/2$.

3. The method according to claim 2 wherein the Hurst (pH) parameter estimation is made using a frame-by-frame procedure.

4. The method according to claim 2 wherein the Hurst parameter (pH) estimation step is made using a cumulative procedure.

5. The method according to claim 2 wherein the Hurst parameter (pH) estimation step is made using a Higushi estimator.

6. The method according to claim 2 wherein the Hurst parameter (pH) estimation step is made using a R/S estimator.

7. The method according to claim 1, wherein the classification step is made using a multi-dimensional fractional Brownian motion (M_dim$_{13}$ fBm) process which comprises the following steps:
   a) forming a feature matrix utilizing said speech features, wherein said feature matrix is split into r regions; said feature matrix containing c rows, wherein c is the number of feature coefficients per frame and N columns, where N is the number of frames;
   b) applying a wavelet decomposition in order to obtain the detail sequences for each row of the feature matrix in a certain region;
   estimating a mean, a variance and Hurst parameters (pH) from each set of detail sequences obtained from each row of step (b), by using a AV (Abry-Veitch) wavelet-based estimator for estimating said pH parameters;
   d) generating fractional Brownian motion (fBm) processes by using a Random Midpoint Displacement (RMD) algorithm and said parameters computed in step (c), to obtain c fBm processes for a given said region;
   e) computing a histogram of each said fBm process of said given region, wherein a set of all histograms of a given region defines a speaker c-dimensional model for said given region;
   f) repeating steps (b) through (e) for all of the r regions, in order to create a r.c-dimensional fBm process, which defines M__$_{dim}$_fBm model for said speaker.

8. Method for classifying a speaker, for speaker recognition and/or speaker verification, said method comprising the following steps:
   a) obtaining a speech signal from a speaker;
   b) converting said speech signal to a digital signal by means of an A/D converter;
   c) extracting speech features from said digital speech signal;
   d) forming a matrix utilizing said speech features; wherein said matrix is split into r regions; said matrix containing c rows, where c is the number of feature coefficients per frame, and N columns, where N is the number of frames;
   applying a wavelet decomposition to each row of said matrix in a certain region in order to obtain a set of detail sequences for said certain region;
   e) estimating a mean, a variance and pH parameters of said features for each said set of detail sequences, obtained from each said row of said matrix;
   f) generating fractional Brownian motion processes (fBm) using a Random Midpoint Displacement (RMD) algorithm and said parameters computed in step (e) to obtain thereby c fBm processes for a given said region;
   g) computing a histogram for each said fBm process of said given region, wherein a set of all of said histograms for said given region defines a speaker c-dimensional model for said given region;
   h) repeating steps (e) through (g) for each of the r regions, in order to produce a r.c-dimensional fBm process, which defines a multi-dimensional fBm model for said speaker; and
   i) classifying said speaker based on said extracted features, said classification encompassing speaker recognition and/or speaker verification.

* * * * *

UNITED STATES PATENT AND TRADEMARK OFFICE
CERTIFICATE OF CORRECTION

PATENT NO. : 7,904,295 B2  Page 1 of 1
APPLICATION NO. : 11/661956
DATED : March 8, 2011
INVENTOR(S) : Coelho It is certified that error appears in the above-identified patent and that said Letters Patent is hereby corrected as shown below:

On the title page:
In ITEM (76) Inventor:

Change "Rosangelo" to --Rosangela--.

Signed and Sealed this
Twenty-second Day of November, 2011

David J. Kappos
*Director of the United States Patent and Trademark Office*